United States Patent [19]

Fink et al.

[11] 4,140,577
[45] Feb. 20, 1979

[54] PHOTODETACHMENT PROCESS FOR BEAM NEUTRALIZATION

[75] Inventors: Joel H. Fink; Alan M. Frank, both of Livermore, Calif.

[73] Assignee: The United States of America as represented by the United States Department of Energy, Washington, D.C.

[21] Appl. No.: 726,025

[22] Filed: Sep. 22, 1976

[51] Int. Cl.² ............................................ G01N 27/78
[52] U.S. Cl. ............................................ 176/1; 176/5; 250/251
[58] Field of Search ................. 176/1, 5; 250/251; 332/7.51

[56] References Cited

U.S. PATENT DOCUMENTS

| | | | |
|---|---|---|---|
| 3,402,358 | 9/1968 | Wharton | 250/251 |
| 3,424,904 | 1/1969 | Donnally | 250/251 |
| 3,516,727 | 6/1970 | Hickey et al. | 332/7.51 |
| 3,558,877 | 1/1971 | Pressman | 250/251 |
| 3,652,393 | 3/1972 | Kaiser et al. | 250/251 |
| 3,679,897 | 7/1972 | Hansen et al. | 176/1 |
| 3,697,313 | 7/1972 | Rosenberg | 332/112 |
| 3,742,219 | 1/1973 | Damm et al. | 250/251 |
| 3,778,612 | 12/1973 | Ashkin | 250/251 |
| 3,808,432 | 4/1974 | Ashkin | 250/251 |

OTHER PUBLICATIONS

Bryant et al., Phys. Rev. Lett., 27, 1628 (1971).
AFAL-TR-74-162, (5/75) Exhibit A.
Phys. Rev. Letters, 19, 737-741, Brehm et al., (1967).
Phy. Rev. Lett., 25, 424-427, Lineberger et al.
J. Chem. Phys., vol. 48, 1968, 943-945, Hall et al.
Abstract of UCID-16844, (18 Jul. 1975).

Primary Examiner—Samuel W. Engle
Assistant Examiner—S. A. Cangialosi
Attorney, Agent, or Firm—Dean E. Carlson; Roger S. Gaither; P. Martin Simpson, Jr.

[57] ABSTRACT

A process for neutralization of accelerated ions employing photo-induced charge detachment. The process involves directing a laser beam across the path of a negative ion beam such as to effect photodetachment of electrons from the beam ions. The frequency of the laser beam employed is selected to provide the maximum cross-section for the photodetachment process.

8 Claims, 2 Drawing Figures

PHOTODETACHMENT PROCESS FOR BEAM NEUTRALIZATION

BACKGROUND OF THE INVENTION

The invention described herein was made in the course of, or under, Contract No. W-7405-ENG-48, with the Energy Research and Development Administration.

This invention relates to the generation of high energy neutral beams for controlled thermonuclear reactions, particularly to neutralization of accelerated ions for controlled thermonuclear reactions, and more particularly to a photodetachment process for neutralization of such accelerated ions.

In the generation of high energy neutral beams of large equivalent current for controlled thermonuclear reactions, beam neutralizers are used for converting a charged particle beam into a beam of neutral particles. Such beam neutralizer devices are typically employed in the controlled thermonuclear reactor (CTR) neutral beam injection systems.

Conventional beam neutralizers are based on a charge exchange process between a gas, such as water vapor, and the charged particles of a beam directed through the gas, such as illustrated by U.S. Pat. No. 3,152,959 issued Oct. 13, 1964, to C. C. Damm. While these prior known beam neutralizers have effectively converted charged particle beams into beams of neutral particles, a need has existed for a more efficient method, particularly when large equivalent current beams are involved.

Apparatus for practicing the process in the present application is described and claimed in U.S. patent application Ser. No. 725,906, filed on the same day as the present application, by the same inventors as the present application, and assigned to the same assignee as the present application.

SUMMARY OF THE INVENTION

The present invention solves the above-mentioned need by providing an efficient method for neutralizing charged particle beams. Basically the invention provides a beam neutralizer technique employing a photoinduced charge detachment process. More specifically, the present invention involves directing at least one beam of laser energy across the path of a negative ion beam such as to effect photodetachment of electrons from the beam ions. An apparatus for carrying out the photodetachment process utilizes a cavity allowing passage therethrough of a high energy negative ion beam and entrance therein of at least one laser beam such as to effect a photodetachment of electrons from negative ions resulting in neutralization of the ion beam. The frequency of the laser beam employed is selected to provide the maximum cross-section for the photodetachment process.

Accordingly, it is an object of this invention to provide a process for neutralization of accelerated ions.

A further object of the invention is to provide beam neutralization employing a photo-induced charge detachment process.

Another object of the invention is to provide a process utilizing photodetachment for neutralization of accelerated ions for controlled thermonuclear reactions.

Another object of the invention is to provide a process for neutralizing a charged particle beam by directing a laser beam across the path of the negative ion beam such as to effect photodetachment of electrons from the beam ions.

Another object of the invention is to provide a beam neutralization process utilizing a cavity through which a high energy negative ion beam is passed and into which a laser beam is directed such as to effect a photodetachment process resulting in neutralization of the ion beam.

Other objects of the invention will become readily apparent from the following description and accompanying drawings.

DESCRIPTION OF THE INVENTION

The invention is directed to a technique for converting a charged particle beam, such as a hydrogen negative ion ($H^-$) beam, into a beam of neutral particles by employing a photoinduced charge detachment process.

The basic concept of the invention involves directing one or more laser beams across the path of a negative ion beam such as to effect photodetachment of electrons from the beam ions. The frequency of the laser beam or beams employed is selected to provide the maximum cross-section for the photodetachment process.

An embodiment for carrying out the invention, such as for use in a controlled thermonuclear reactor (CTR) neutral beam injection system, comprises a cavity allowing passage therethrough of a high energy negative ion beam and entrance thereinto of a laser beam such as to effect a photodetachment process resulting in neutralization of the ion beam. The cavity walls are preferably constructed of a material, such as a dielectrically enhanced metal reflector (silver overcoated with silicon dioxide, $SiO_2$ and titanium dioxide, $TiO_2$), for example, which causes low-loss multiple reflections of the laser beam in the cavity, to thereby enhance the efficiency of the photodetachment process. For example, gallium arsenide, solid state lasers cooled by liquid nitrogen may be utilized for carrying out this process, since such lasers have the advantages of excellent efficiency, an output frequency at the peak of the photodetachment cross-section, and the capability of low-loss multiple reflections to enhance the process.

Figure 1:
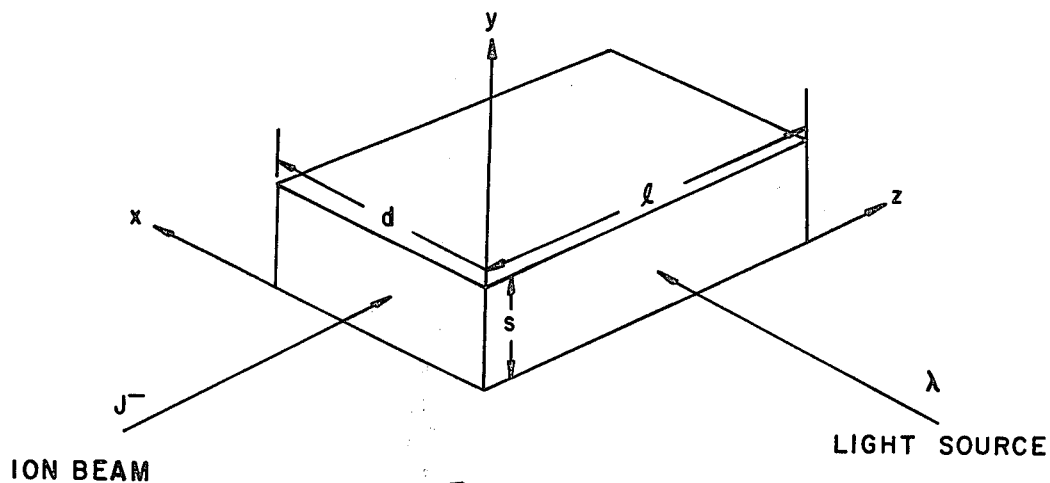
FIG. 1 diagrammatically illustrates the geometry of an ion beam and light interaction region.

The power requirements of photodetachment can be readily derived using the ion beam and light interaction region geometry shown in FIG. 1. Assume that a negative ion beam with current $I^-$ A and current density $J^-$ A/cm$^2$ enters the region of interaction, so that $$I^- = J^- sd, \qquad (1)$$

where s and d are the dimensions of the ion-beam cross section.

If the surface sl is uniformly illuminated by $W_f$ watts of light flux having wavelength $\lambda$, the incident photon flux density is $\lambda W_f/hcsl$ photons/cm$^2$-sec, where h is Planck's constant and c is the speed of light. Then, if $\sigma$ represents the photodetachment cross section of the ions exposed to light of wavelength $\lambda$, the rate of photodetachment $\rho$ becomes $$\rho = \frac{\lambda W_f \sigma}{hcsl}. \tag{2}$$

As a result, the photodetachment process can be described by $$\frac{dI^-}{dt} = \rho I^-. \tag{3}$$

Introducing the ion beam velocity, $$v = \frac{dz}{dt}, \tag{4}$$

into the previous equation results in an expression for the fraction of high-energy neutrals to be found in the ion beam at $z = l$; i.e., $$F_0(l) = 1 - e^{-q}, \tag{5}$$

where $$q = \frac{\lambda W_f \sigma}{vhcs}. \tag{6}$$

Therefore the light flux required to neutralize a fraction $F_0(l)$ of the incident ion beam is $$W_f = \frac{qvhcs}{\lambda \sigma} \tag{7}$$

With a light source of absolute efficiency $\eta_e$, defined as the ratio of watts of light flux to the watts of electrical input, the required power input is $$W_{in} = W_f/\eta_e. \tag{8}$$

Finally, combining Eqs. 1, 7, and 8, the ratio of input power to negative ion beam power is determined as follows:

$$\frac{W_{in}}{I^- V} = \frac{1}{J^- d} \frac{qvhc}{\eta_e \lambda \sigma V}, \tag{9}$$

where V is the potential of the ion beam.

The techniques developed for laser isotope separation can be used to markedly increase the effective photon flux. The ion beam can be passed through a resonant laser cavity where multiple reflections increase the useful laser output.

We can compute the total power in the cavity, $W_c$, given the laser output power, $W_l$, and the reflectivity of the cavity, R:

$$W_c = W_l(1 + R + R^2 + R^3 + ...) \tag{10}$$

or $$W_c = W_l\left(\frac{1}{1-R}\right) \tag{11}$$

If we use N cavities the total power available, W, becomes $$W = NW_c = NW_1\left(\frac{1}{1-R}\right). \tag{12}$$

Combining Eqs. 8, 9, and 12, the fraction of the power in the negative ion beam required for $F_0(l)\%$ neutralization is $$\frac{W_{in}}{I^- V} = \frac{1-R}{J^- d} \frac{qvhc}{\eta_e \lambda \sigma V}. \tag{13}$$

From Eqs. 7 and 12, the number of cavities required for $F_0(l)\%$ neutralization is $$N = \frac{(1-R)qvhcs}{W_l \lambda \sigma}. \tag{14}$$

To examine the feasibility of neutralizing a 200-keV deuterium negative-ion beam, for example, we use stacks of three solid state lasers. We employ the parameters from gallium arsenide, cryogenically operated lasers that are commercially available.

The parameters describing these lasers and the ion beam they neutralize are presented hereinafter in Table 1. Introducing the appropriate values from Table 1 into Eq. 13, we see that it is possible to neutralize 95% of a negative ion beam with only 3.9% of the beam power. However, this entails 10 sets of 25 laser assemblies to overcome the short pulse length and provide continuous output (Eq. 14). Because of the ion beam interaction path length, more than 3.5 m, is excessive, and thus such large-number of lasers on each side of the beam line becomes economically impractical, although rapid improvement in laser performance will reduce the number of lasers required.

TABLE 1

| | | | Values | | |
|---|---|---|---|---|---|
| | Symbol | Units | Typical | Min | Max |
| Deuterium negative ion beam | | | | | |
| Potential | V | kV | 200 | | |
| Velocity | v | cm/s | $4.5 \times 10^8$ | | |
| Current | $I^-$ | A | 3.8 | | |
| Current density | $J^-$ | A/cm$^2$ | 0.1 | | |
| Beam width | d | cm | 100 | | |
| For 95% neutralization | q | — | 3 | | |
| Laser Beam | | | | | |
| Power efficiency | $\eta_e$ | % | 28 | 20 | |
| Peak forward voltage | — | V | 61 | | 87 |
| Wave length of peak radiant intensity | $\lambda$ | nm | 852 | 847 | 857 |
| Spectral bandwidth at 50% intensity | | nm | 5 | | 10 |
| Half-angle beam spread at 90% intensity | | deg | 21 | | 30 |
| Duty factor | | % | | | 4 |

TABLE 1-continued

Laser and negative deuterium ion beam data.

Figure 2:
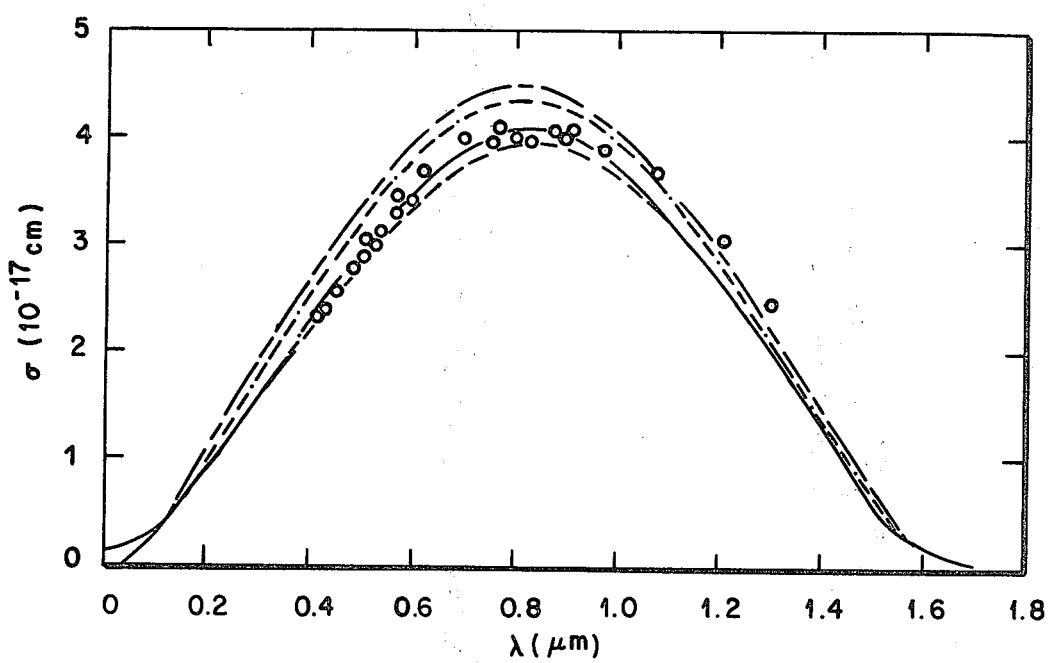
FIG. 2 graphically illustrates the experimental photodetachment cross section for $H^-$ (dot) in accordance with the invention compared with the results of four theoretical calculations.

|  | Symbol | Units | Typical | Min | Max |
|---|---|---|---|---|---|
| Source depth | S | cm | 0.38 | | |
| Width of individual laser | l | cm | 2.8 | | |
| Pulse length | | $\mu s$ | 2 | | |
| Output of 25 lasers fixed in sequence | $W_l$ | W | 600 | | |
| Miscellaneous | | | | | |
| Reflectance of cavity wall | R | % | 99.8 | | |
| Cross-section at $\mu$ (FIG. 2) | $\sigma$ | $cm^2$/photon | $4 \times 10^{-17}$ | | |

A system approach, similar to that used in isotope separation (which uses the beam lines as the laser cavity) provides the improvements in performance that makes photodetachment a viable process.

It has thus been shown that the present invention provides a beam neutralization process in which a high energy negative ion beam is exposed to laser light, such as to effecting photodetachment of electrons from the beam ions resulting in neutralization of the ion beam. Thus, the present invention advances the state of the beam neutralization techniques for applications particularly in CTR neutral beam injection systems.

While particular parameters, materials, apparatus, etc., have been described, modifications will become apparent to those skilled in the art, and it is intended to cover in the appended claims all such modifications as fall within the spirit and scope of the invention.

What we claim is:

1. A process for neutralization of a negative ion beam comprising:
   providing a multiampere beam of negative ions;
   providing at least one solid state laser;
   producing at least one beam of laser light from the at least one solid state laser, any photon of which light has sufficient energy to photodetach one electron from any one of the negative ions;
   providing a cavity of concave reflectors each having edges and the cavity being around a portion of the negative ion beam, the cavity being outside the solid state laser; positioning the solid state laser near at least one edge of the cavity;
   directing the at least one beam of laser light into the cavity at an angle from the negative ion beam to ensure a multiplicity of reflections at the concave reflectors and a multiplicity of passes of the laser beam through the ion beam to photodetach at least 80% of the negative ions as they pass through the cavity.

2. The process defined in claim 1, additionally including selecting the frequency of the beam of laser light to provide the maximum cross-section for the photodetachment of electrons from the beam ions.

3. The process defined in claim 1, additionally including forming the cavity of material which causes low-loss multiple reflections of the laser light in the cavity.

4. The process as in claim 1, further including selecting the frequency of the beam of laser light to provide the maximum cross section for the photodetachment of an electron from each of the negative ions in the negative ion beam.

5. The process as in claim 4, wherein the negative ion beam is comprised of at least one isotope of hydrogen.

6. The process as in claim 5, wherein the negative ion beam is comprised substantially of deuterium.

7. The process as in claim 4, wherein the said cavity highly reflective surface is on the order of 99% reflectivity at the frequency of laser light used.

8. The process as in claim 7, wherein the highly reflective surface of said cavity is in a shape to maximize the number of reflections of said laser light in said cavity.

* * * * *